United States Patent
Youn et al.

(10) Patent No.: US 7,694,154 B2
(45) Date of Patent: Apr. 6, 2010

(54) METHOD AND APPARATUS FOR SECURELY EXECUTING A BACKGROUND PROCESS

(75) Inventors: Paul Youn, Redwood City, CA (US); Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 999 days.

(21) Appl. No.: 11/433,592

(22) Filed: May 12, 2006

(65) Prior Publication Data

US 2007/0263868 A1 Nov. 15, 2007

(51) Int. Cl.
*H04L 9/14* (2006.01)
*H04L 29/06* (2006.01)
(52) U.S. Cl. .................................. 713/193; 380/277
(58) Field of Classification Search ................. 713/193, 713/54, 165; 726/26, 34; 380/1, 228, 223
See application file for complete search history.

(56) References Cited

U.S. PATENT DOCUMENTS

| | | | |
|---|---|---|---|
| 6,314,409 B2 * | 11/2001 | Schneck et al. ............... 705/54 |
| 6,886,098 B1 * | 4/2005 | Benaloh .................... 713/193 |
| 7,200,747 B2 * | 4/2007 | Riedel et al. ................ 713/165 |
| 2001/0029581 A1 * | 10/2001 | Knauft ....................... 713/193 |
| 2002/0004784 A1 * | 1/2002 | Forbes et al. .................. 705/51 |
| 2004/0133794 A1 * | 7/2004 | Kocher et al. ............... 713/193 |
| 2006/0282669 A1 * | 12/2006 | Legg ......................... 713/171 |
| 2008/0114990 A1 * | 5/2008 | Hilbert et al. .............. 713/189 |

\* cited by examiner

*Primary Examiner*—Gilberto Barron, Jr.
*Assistant Examiner*—Soheila Davanlou
(74) *Attorney, Agent, or Firm*—Park, Vaughn & Fleming LLP (57) ABSTRACT

One embodiment of the present invention provides a system that enables a background process to access encrypted data. During operation, the system executes the background process. Next, the system obtains a set of unencrypted keys by decrypting a set of encrypted keys with a server-key. The system then makes the set of unencrypted keys available to the background process, thereby enabling the background process to encrypt and decrypt data. Finally, the system deletes the set of unencrypted keys.

25 Claims, 5 Drawing Sheets

METHOD AND APPARATUS FOR SECURELY EXECUTING A BACKGROUND PROCESS

BACKGROUND

1. Field of the Invention

The present invention relates to computer security. More specifically, the present invention relates to a method and apparatus for securely executing a background process.

2. Related Art

To protect confidential information from getting into the wrong hands, users often employ cryptographic techniques when storing and/or transmitting the confidential information. When a user needs access to encrypted information, the user typically executes a method to decrypt the encrypted information. Executing this method often involves first performing a verification operation to ensure that the user has permission to access the encrypted information.

In many cases, background processes also need to access encrypted information. Hence, a system that uses a background process which accesses encrypted information must find a secure way to give the background process access to the encrypted information. Previous techniques for enabling a background process to access encrypted information involve hard-coding passwords or cryptographic keys into the code which the background process executes. This can be extremely time-consuming for systems that support many background processes and many cryptographic keys. Furthermore, the security of the hard-coded cryptographic keys is only as great as the security of the storage medium containing the executable code for the background process.

Hence, what is needed is a method for executing a background process without the problems listed above.

SUMMARY

One embodiment of the present invention provides a system that enables a background process to access encrypted data. During operation, the system executes the background process. Next, the system obtains a set of unencrypted keys by decrypting a set of encrypted keys with a server-key. The system then makes the set of unencrypted keys available to the background process, thereby enabling the background process to encrypt and decrypt data. Finally, the system deletes the set of unencrypted keys.

In a variation on this embodiment, prior to executing the background process, the system decrypts executable code for the background process with a public key associated with a user, wherein the executable code is encrypted with a corresponding private key associated with the user. Alternatively, the code may be signed instead of entirely encrypted with the user's private key. Next, the system verifies the integrity of the executable code, and if the executable code has been tampered with, the system prevents the execution of the background process.

In a variation on this embodiment, decrypting the set of encrypted keys with the server-key further involves sending the set of encrypted keys to an external security module, wherein the external security module decrypts the set of encrypted keys to obtain the set of unencrypted keys. The system then receives the set of unencrypted keys from the external security module.

In a variation on this embodiment, executable code for the background process includes meta-data, which specifies restrictions on the execution of the background process.

In a further variation, before the system executes the background process, the system checks the meta-data to see if the meta-data specifies a restriction on the actions of the background process. If so, the system restricts the actions of the background process as is specified in the meta-data.

In a further variation, the meta-data can specify: a data-set restriction, wherein the data-set restriction specifies the data the background process can access; an access-time restriction, wherein the access-time restriction specifies when the background process can access the data; an access-count restriction, wherein the access-count restriction specifies how many times the background process can access the data; and a command-restriction, wherein the command-restriction specifies what commands the background process can execute on the data.

In a variation on this embodiment, the system creates the background process, and also encrypts the set of unencrypted keys with the server-key to create the set of encrypted keys.

In a further variation, after encrypting the set of unencrypted keys with the server-key, the system sends the server-key to an external security module.

In a further variation, after creating the background process, the system encrypts the background process with a private key associated with a user, or a symmetric key known to the server. Alternatively, the process can signed by the private key associated with a user.

In a variation on this embodiment, the unencrypted set of cryptographic keys enables the background process to encrypt/decrypt data stored on a database.

In a variation on this embodiment, the server-key is stored in an external security module coupled to the database.

In a variation on this embodiment, each background process in a plurality of background processes is associated with the server-key.

In a variation on this embodiment, each background process in a plurality of background processes is associated with different server-keys.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention attempts to prevent the background process from exposing keys, passwords, or any other secrets. In addition, one embodiment of the present invention secures the executable code of the background process with a digital signature. This is to prevent a Trojan horse attack (the insertion of malicious software into legitimate source code).

In one embodiment of the present invention, a user who has permission to access a set of cryptographic keys authorizes a background process to perform jobs requiring access to the set of cryptographic keys. In this embodiment, the user needs to have permission and capabilities to perform any action that the user asks the background process to perform. Furthermore, in order for the background process to perform the actions requested by the user, the user must make the necessary cryptographic keys available to the background process. To do so, the user encrypts the necessary cryptographic keys under another key called a "server-key". In this embodiment, the background process can perform any action on behalf of the user and only the server-key needs protecting.

In one embodiment of the present invention, a software security module or a hardware security module protects the server-key.

In one embodiment of the present invention, the server-key can be a cryptographic key associated with a user who will present the cryptographic key at the time the background process executes.

In one embodiment of the present invention, the user: encrypts the executable code of the background process; uses a keyed hash; signs the code; or performs any other integrity enforcing method known to those familiar in the art.

In one embodiment of the present invention, the background process can be associated with meta-data, such as an expiration period beyond which the background process cannot use the cryptographic keys, an identifier for data the background process has permission to access, or how many times the background process can execute. In this embodiment, an integrity-checking mechanism protects the meta-data.

Computing Environment

Figure 1:
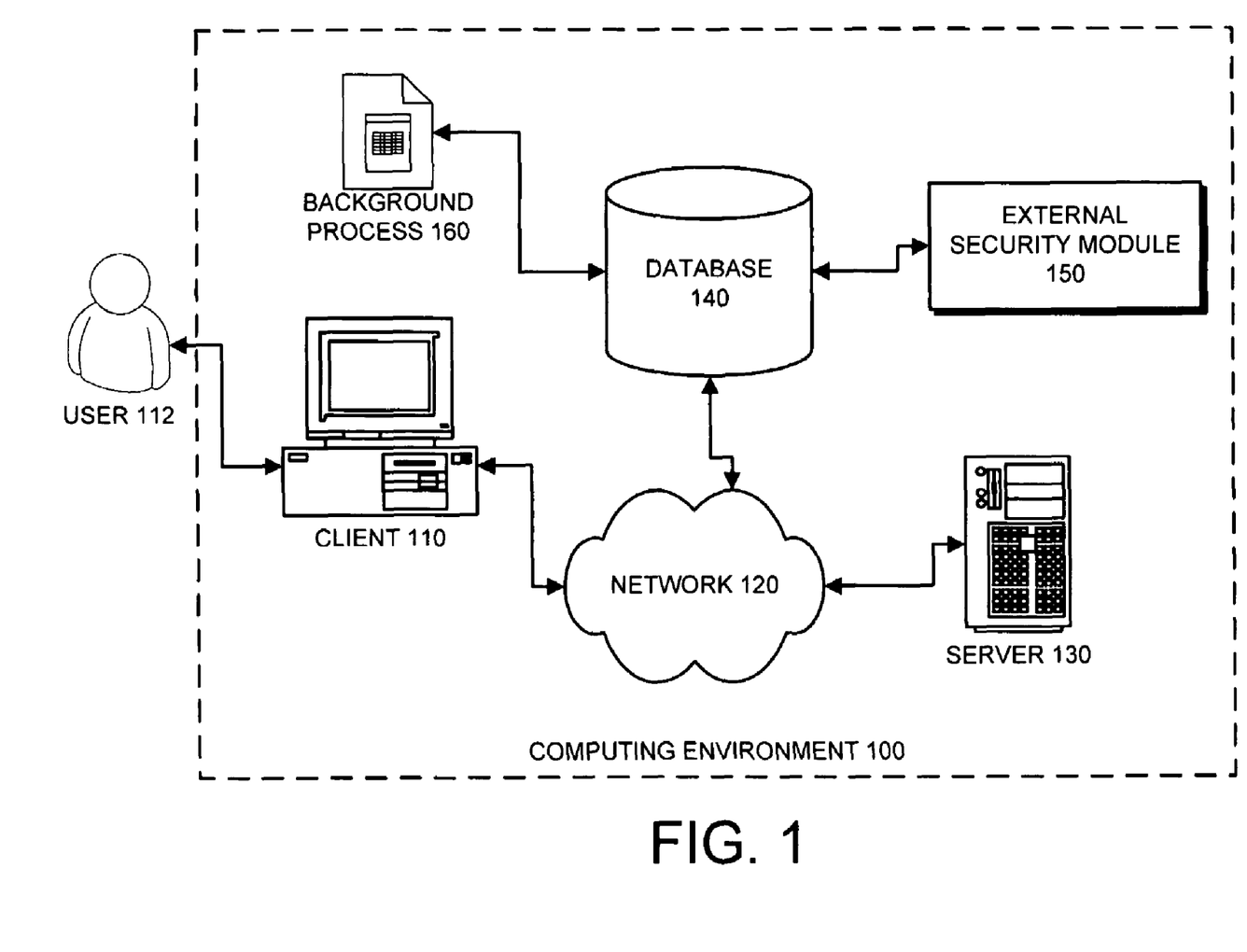
FIG. 1 illustrates a computing environment in accordance with an embodiment of the present invention.

FIG. 1 illustrates a computing environment 100 in accordance with an embodiment of the present invention. Computing environment 100 can generally include any type of computer system, including, but not limited to, a computer system based on a microprocessor, a mainframe computer, a digital signal processor, a portable computing device, a personal organizer, a device controller, and a computational engine within an appliance. Computing environment 100 includes client 110, network 120, server 130, database 140, external security module 150, and background process 160.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 includes the Internet.

Server 130 can generally include any computational node including a mechanism for servicing requests from a client for computational and/or data storage resources.

Database 140 can generally include any type of system for storing data in non-volatile storage. This includes, but is not limited to, systems based upon magnetic, optical, and magneto-optical storage devices, as well as storage devices based on flash memory and/or battery-backed up memory.

External security module 150 can generally include any physical or logical device created to be highly resistant to unauthorized access. A physical external security module (ESM) is referred to as a hardware security module (HSM). In an HSM, all sensitive data is stored in a separate physical storage device with its own access control policies. The physical storage device along with its software interfaces are usually certified or tested against both physical and software-based intrusion attempts. Note that a security officer can couple external security module 150 to database 140 (as illustrated), or to server 130.

Background process 160 can generally include any process that has the same or fewer rights and privileges as the user who created the process, but is capable of running without user interaction. Note that background process 160 can execute on any system including client 110, server 130, and database 140 (as illustrated). Background process 160 executes on a physical device, but background process 160 itself is not a separate physical entity.

In one embodiment of the present invention, user 112 includes meta-data when writing the code for background process 160. This meta-data can include restrictions on the execution of background process 160. For example, the meta-data can restrict how often background process 160 executes, when background process 160 executes, what data background process 160 accesses, when background process 160 accesses the data, how often background process 160 accesses the data, and what commands background process 160 executes on the data. By including meta-data with the executable code for background process 160, user 112 reduces the harm a malicious user or a malicious piece of software can cause by corrupting background process 160.

In one embodiment of the present invention, user 112 does not include cryptographic keys when writing the executable code for background process 160. By not including cryptographic keys with the executable code for background process 160, user 112 reduces the probability that a malicious user or a malicious piece of software is able to harness background process 160 to perform malicious actions on data background process 160 accesses.

For example, suppose in one embodiment of the present invention that, background process 160 needs to access data stored on database 140. In this case, background process 160 executes an API (application programmer interface) call which causes database 140 to send a set of encrypted keys to external security module 150. External security module 150 decrypts the set of encrypted keys with a server-key associated with background process 160 to obtain a set of unencrypted keys and sends the set of unencrypted keys to database 140. Background process 160 can then access the data using the set of unencrypted keys. Note that the server-key is associated with background process 160 because the server-key is associated with user 112, the owner of background process 160.

In one embodiment of the present invention, database 140 possesses the server-key. In this embodiment, database 140 can decrypt the set of encrypted keys.

In one embodiment of the present invention, the same server-key is associated with multiple background processes.

In one embodiment of the present invention, a different server-key is associated with each background process. In this embodiment, possessing the server-key serves as an authenticator for the background process.

Executing a Background Process

Figure 2:
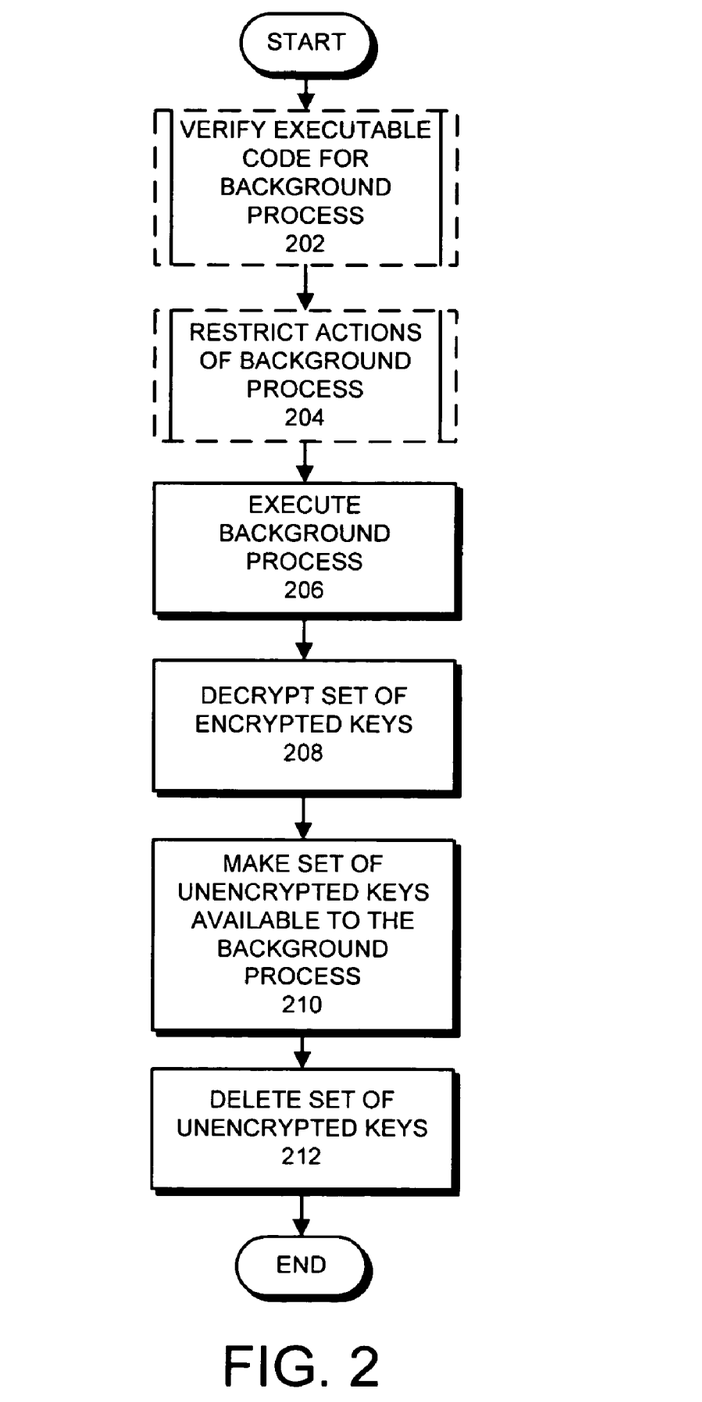
FIG. 2 presents a flowchart illustrating the process of executing a background process in accordance with an embodiment of the present invention.

FIG. 2 presents a flowchart illustrating the process of executing a background process in accordance with an embodiment of the present invention.

In this embodiment, the process begins when database 140 verifies the integrity of the executable code for background process 160 (step 202). Verifying the integrity of the executable code helps ensure that a malicious user has not inserted code into the executable code. This step is optional as is illustrated by the broken lines surrounding step 202.

In one embodiment of the present invention, the process begins when database 140 restricts the actions of background process 160 (step 204). Restricting the actions of background process 160 helps limit the effect of code which may be inserted into the executable code for background process 160 by a malicious user. This step is optional as is illustrated by the broken lines surrounding step 204.

In one embodiment of the present invention, the process begins when database 140 executes background process 160 (step 206). Then database 140 decrypts a set of encrypted keys (step 208).

In one embodiment of the present invention, database 140 sends the set of encrypted keys to external security module 150 which then decrypts the set of encrypted keys with the server-key associated with background process 160 to obtain a set of unencrypted keys. External security module 150 then sends the set of unencrypted keys to database 140.

Next, database 140 makes the set of unencrypted keys available to background process 160 (step 210). Note that the unencrypted set of cryptographic keys enable background process 160 to encrypt/decrypt data stored on database 140.

In one embodiment of the present invention, making the set of unencrypted keys available to background process 160 can involve storing the set of unencrypted keys in a memory space accessible to background process 160, providing the keys to background process 160 via an API call, or using the set of unencrypted keys on behalf of background process 160 in response to commands background process 160 executes.

After background process 160 has finished executing, database 140 then deletes the set of unencrypted keys (step 212).

In one embodiment of the present invention, database 140 does not wait until the background process has finished executing to delete the set of unencrypted keys. In this embodiment, database 140 deletes the set of unencrypted keys after a specified period of time, after background process 160 executes a specific command, after receiving a command from user 112, or after user 112 halts the execution of background process 160. This embodiment helps reduce how long the set of unencrypted keys are exposed to a potential malicious user.

Verifying the Background Process Code

Figure 3:
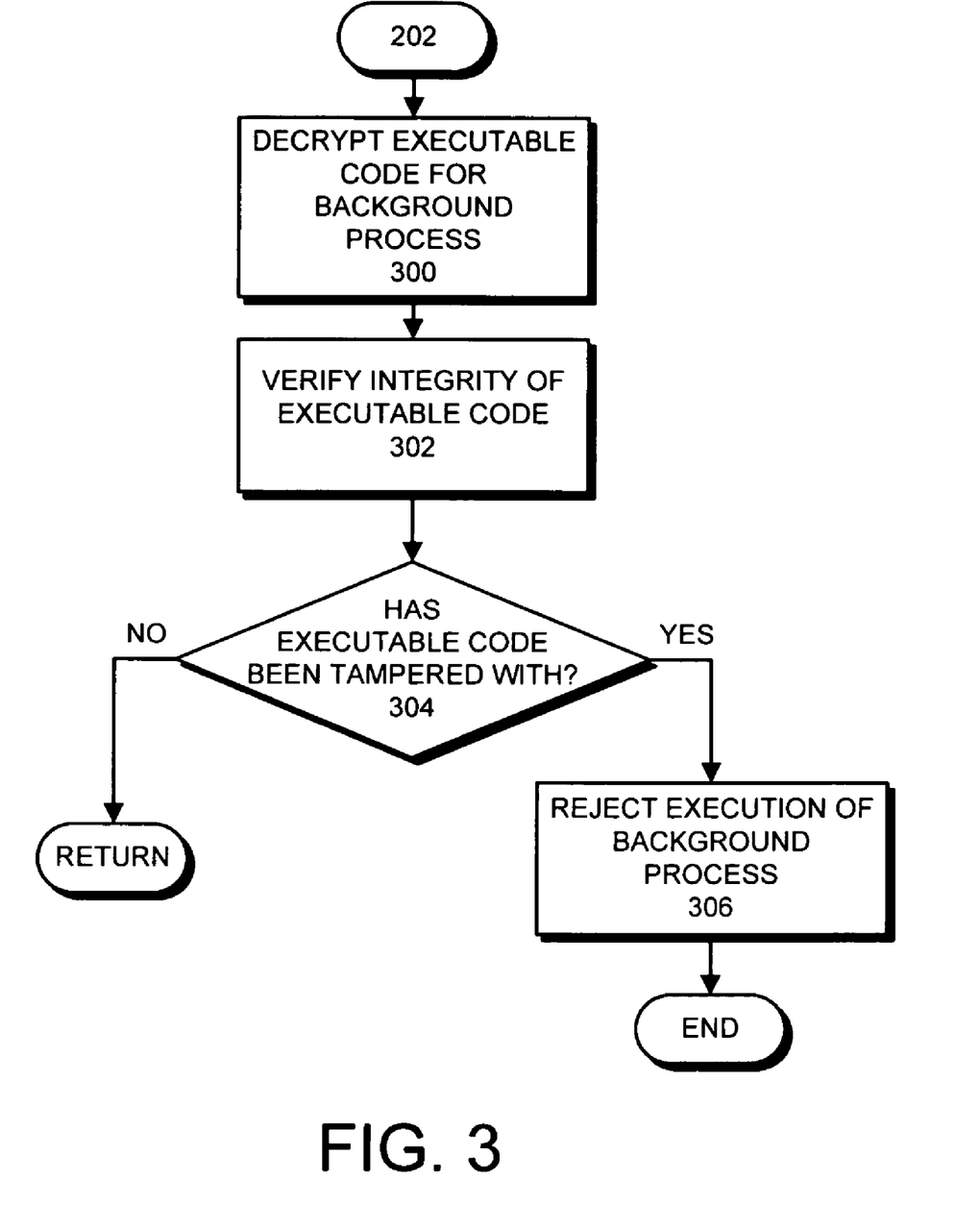
FIG. 3 presents a flowchart illustrating the process of verifying the integrity of executable code for a background process in accordance with an embodiment of the present invention.

FIG. 3 presents a flowchart illustrating the process of verifying the integrity of executable code for a background process in accordance with an embodiment of the present invention. The process begins when database 140 decrypts the executable code for background process 160 (step 300). Next, database 140 verifies the integrity of the executable code of background process 160 (step 302). Note that verifying the integrity of the executable code of background process 160 can involve verifying the signature of a user who authenticated the background process, verifying the result of a hash function, verifying a checksum, or any other method of verifying the integrity of code known to those familiar in the art.

Next, database 140 determines if a malicious user has tampered with the executable code of background process 160 (step 304). If so, database 140 prevents execution of background process 160 (step 306).

Restricting the Background Process

Figure 4:
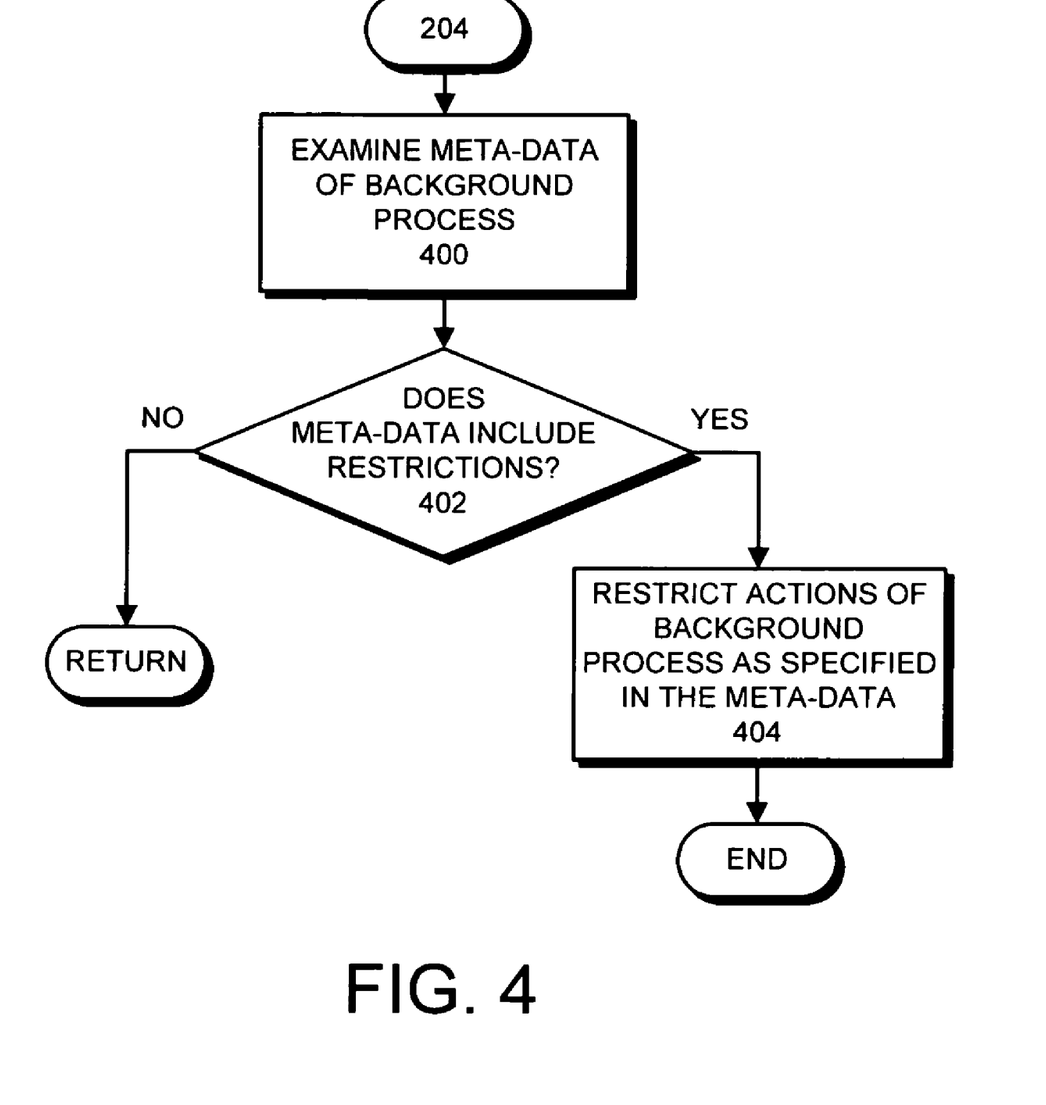
FIG. 4 presents a flowchart illustrating the process of restricting the actions of a background process in accordance with an embodiment of the present invention.

FIG. 4 presents a flowchart illustrating the process of restricting the actions of a background process in accordance with an embodiment of the present invention. The process begins when database 140 examines meta-data for background process 160 (step 400). Database 140 then determines if the meta-data includes restrictions on the actions of background process 160 (step 402). If so, database 140 restricts the actions of background process 160 as specified in the meta-data (step 404).

Creating a Background Process

Figure 5:
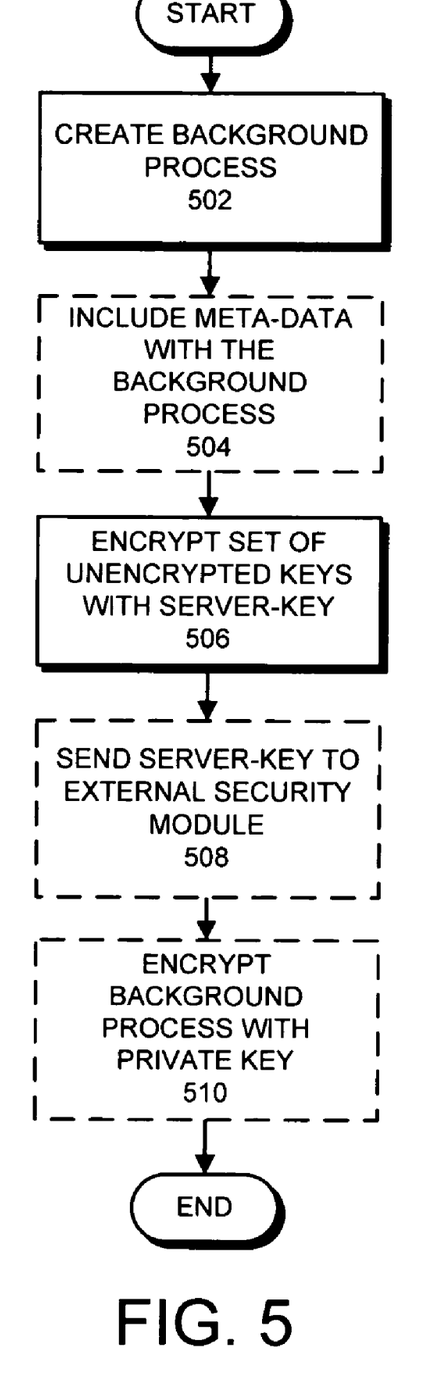
FIG. 5 presents a flowchart illustrating the process of creating a background process in accordance with an embodiment of the present invention.

FIG. 5 presents a flowchart illustrating the process of creating a background process in accordance with an embodiment of the present invention. The process begins when user 112 creates background process 160 (step 502). Next, user 112 includes meta-data with background process 160 (step 504). This meta-data specifies restrictions on the execution of background process 160 and on the data background process 160 accesses. Including meta-data with background process 160 is advantageous because the meta-data reduces the harm a malicious user can cause if the malicious user was able to insert malicious code into background process 160. This step is optional as is illustrated by the broken lines surrounding step 504.

Next, user 112 encrypts a set of unencrypted keys with a server-key (step 506).

In one embodiment of the present invention, user 112 sends the server-key to external security module 150 (step 508). In this embodiment, database 140 must communicate with external security module 150 to decrypt the set of encrypted keys. This step is optional as is illustrated by the broken lines surrounding step 508.

In one embodiment of the present invention, user 112 encrypts background process 160 with a private key associated with user 112 (step 510). In this embodiment database 140 verifies the integrity of background process 160 before executing background process 160. This is advantageous because encrypting background process 160 prevents a malicious user from inserting malicious code into the executable code for background process 160. This step is optional as is illustrated by the broken lines surrounding step 510.

In one embodiment of the present invention, user 112 computes a hash value of the executable code for background process 160 to ensure the integrity of background process 160.

In one embodiment of the present invention, user 112 signs the background process to ensure the integrity of background process 160. In this embodiment, database 160 verifies that user 112 signed the background process prior to executing background process 160.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates a background process to access encrypted data, the method comprising:
   executing the background process that accesses data stored in a database, wherein the background process is a computer process that is executed with a low priority, wherein the data is encrypted with a set of keys, and wherein the set of keys is encrypted with a server key;
   decrypting the set of encrypted keys with the server-key to obtain a set of unencrypted keys;
   making the set of unencrypted keys available to the background process to facilitate the background process to encrypt or decrypt the data; and
   deleting the set of unencrypted keys after the background process accesses the data, thereby reducing length of a period during which the set of unencrypted keys used by the background process is exposed to security attacks.

2. The method of claim 1, wherein prior to executing the background process, the method further comprises:
   decrypting executable code for the background process with a public key associated with a user, wherein the executable code is encrypted with a corresponding private key associated with the user;
   verifying the integrity of the executable code; and
   if the executable code has been tampered with, preventing execution of the background process.

3. The method of claim 1, wherein decrypting the set of encrypted keys with the server-key further involves:
   sending the set of encrypted keys to an external security module, wherein the external security module decrypts the set of encrypted keys to obtain the set of unencrypted keys; and
   receiving the set of unencrypted keys from the external security module.

4. The method of claim 1, wherein executable code for the background process includes meta-data, which specifies restrictions on the execution of the background process.

5. The method of claim 4, wherein a restriction in the meta-data can specify:
   a data-set restriction, wherein the data-set restriction specifies the data the background process can access;
   an access-time restriction, wherein the access-time restriction specifies when the background process can access the data;
   an access-count restriction, wherein the access-count restriction specifies how many times the background process can access the data; and
   a command restriction, wherein the command restriction specifies what commands the background process can execute on the data.

6. The method of claim 1, further comprising:
   creating the background process; and
   encrypting the set of unencrypted keys with the server-key to create the set of encrypted keys.

7. The method of claim 6, wherein after encrypting the set of unencrypted keys with the server-key the method further involves sending the server-key to an external security module.

8. The method of claim 6, wherein after creating the background process the method further involves encrypting the background process with a private key associated with a user.

9. The method of claim 1, wherein each background process in a plurality of background processes is associated with the server-key.

10. The method of claim 1, wherein each background process in a plurality of background processes is associated with different server-keys.

11. A computer-readable storage medium storing instructions that when executed by a computer cause the computer to perform a method that facilitates a background process to access encrypted data, the method comprising:
   executing the background process that accesses data stored in a database, wherein the background process is a computer process that is executed with a low priority, wherein the data is encrypted with a set of keys, and wherein the set of keys is encrypted with a server key;
   decrypting the set of encrypted keys with the server-key to obtain a set of unencrypted keys;
   making the set of unencrypted keys available to the background process to facilitate the background process to encrypt or decrypt the data; and
   deleting the set of unencrypted keys after the background process accesses the data, thereby reducing length of a period during which the set of unencrypted keys used by the background process is exposed to security attacks.

12. The computer-readable storage medium of claim 11, wherein prior to executing the background process, the method further comprises:
   decrypting executable code for the background process with a public key associated with a user, wherein the executable code is encrypted with a corresponding private key associated with the user;
   verifying the integrity of the executable code; and
   if the executable code has been tampered with, preventing execution of the background process.

13. The computer-readable storage medium of claim 11, wherein decrypting the set of encrypted keys with the server-key further involves:
   sending the set of encrypted keys to an external security module, wherein the external security module decrypts the set of encrypted keys to obtain the set of unencrypted keys; and
   receiving the set of unencrypted keys from the external security module.

14. The computer-readable storage medium of claim 11, wherein executable code for the background process includes meta-data, which specifies restrictions on the execution of the background process.

15. The computer-readable storage medium of claim 14, wherein a restriction in the meta-data can specify:
   a data-set restriction, wherein the data-set restriction specifies the data the background process can access;
   an access-time restriction, wherein the access-time restriction specifies when the background process can access the data;
   an access-count restriction, wherein the access-count restriction specifies how many times the background process can access the data; and
   a command restriction, wherein the command restriction specifies what commands the background process can execute on the data.

16. The computer-readable storage medium of claim 11, further comprising:
   creating the background process; and
   encrypting the set of unencrypted keys with the server-key to create the set of encrypted keys.

17. The computer-readable storage medium of claim 16, wherein after encrypting the set of unencrypted keys with the server-key the method further involves sending the server-key to an external security module.

18. The computer-readable storage medium of claim 16, wherein after creating the background process the method further involves encrypting the background process with a private key associated with a user.

19. The computer-readable storage medium of claim 11, wherein each background process in a plurality of background processes is associated with the server-key.

20. The computer-readable storage medium of claim 11, wherein each background process in a plurality of background processes is associated with different server-keys.

21. An apparatus that facilitates a background process to access encrypted data, comprising:

an executing mechanism configured to execute the background process that accesses data stored in a database, wherein the background process is a computer process that is executed with a low priority, wherein the data is encrypted with a set of keys, and wherein the set of keys is encrypted with a server key;

a decrypting mechanism configured to decrypt the set of encrypted keys with the server-key to obtain a set of unencrypted keys;

a provisioning mechanism configured to make the set of unencrypted keys available to the background process to facilitate the background process to encrypt or decrypt the data; and a deleting mechanism configured to delete the set of unencrypted keys after the background process accesses the data, thereby reducing length of a period during which the set of unencrypted keys used by the background process is exposed to security attacks.

22. The apparatus of claim 21, further comprising:

a decrypting mechanism configured to decrypt executable code for the background process with a public key associated with a user, wherein the executable code is encrypted with a corresponding private key associated with the user;

a verification mechanism configured to verify the integrity of the executable code; and a prevention mechanism configured to prevent execution of the background process.

23. The apparatus of claim 21, further comprising:

an external security module;

a sending mechanism configured to send the set of encrypted keys to the external security module, wherein the external security module decrypts the set of encrypted keys to obtain the set of unencrypted keys; and a receiving mechanism configured to receive the set of unencrypted keys from the external security module.

24. The apparatus of claim 21, further comprising:

a process creation mechanism configured to create the background process; and an encryption mechanism configured to encrypt the set of unencrypted keys with the server-key to create the set of encrypted keys.

25. The apparatus of claim 24, wherein the encryption mechanism is further configured to encrypt the background process with a private key associated with a user.

* * * * *

UNITED STATES PATENT AND TRADEMARK OFFICE
CERTIFICATE OF CORRECTION

PATENT NO. : 7,694,154 B2  
APPLICATION NO. : 11/433592  
DATED : April 6, 2010  
INVENTOR(S) : Paul Youn et al.

Page 1 of 1

It is certified that error appears in the above-identified patent and that said Letters Patent is hereby corrected as shown below:

Title page, Item (74), under "Attorney, Agent, or Firm" column 2, line 1, delete "Park, Vaughn" and insert -- Park, Vaughan --, therefor.

Signed and Sealed this

Twenty-second Day of February, 2011

David J. Kappos
*Director of the United States Patent and Trademark Office*